UNITED STATES PATENT OFFICE.

HENRY DEACON, OF WIDNES, ENGLAND.

IMPROVEMENT IN THE MANUFACTURE OF BLEACHING-LIQUORS.

Specification forming part of Letters Patent No. 139,239, dated May 27, 1873; application filed May 16, 1873.

*To all whom it may concern:*

Be it known that I, HENRY DEACON, of Widnes, in the county of Lancaster, England, alkali manufacturer, have invented Improvements in the Manufacture of Bleaching-Liquor, of which the following is a specification:

Bleaching-liquor is usually formed by causing a mixture of caustic lime and water to absorb chlorine, and the reaction may be represented by the following formula:

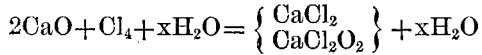

But if the caustic lime be replaced by carbonate of lime, then the reaction may be represented as follows: $CaCo_3 + Cl_4 + xH_2O = Co_2 + H_2Cl_2O_2 + CaCl_2 + (x-1) H_2O$; and the result may be described as a mixed solution of chloride of calcium and hypochlorous acid, with liberation of carbonic acid. This solution may be used for bleaching purposes instead of the ordinary bleaching-liquor, or it may be used for the production of pure chlorine by the addition to it of hydrochloric acid, or it may be converted into ordinary bleaching-liquor by the addition of caustic lime, as shown in the following formula:

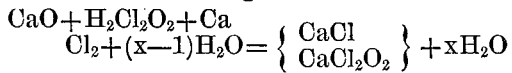

Now, my invention consists in using certain kinds of carbonate of lime to replace wholly or in part the caustic lime usually employed. One of the kinds of carbonate of lime I employ is that procured in a state of fine division by causticising solutions of the carbonates of soda or of potash. This finely-divided material is usually a mixture of caustic lime with carbonate of lime, and may be used with water instead of caustic lime, and be impregnated with chlorine in the usual bleaching-liquor making apparatus, too well known to need description.

The other kind of carbonate of lime I employ is chalk or limestone, in lumps. I fill towers or columns or other vessels constructed of stone or other suitable materials with such lumps of chalk or limestone, which are continually moistened with water or with weak liquor produced in the course of the manufacture, and I pass chlorine gas, or gases containing chlorine, through the apparatus among the lumps of chalk or limestone. Carbonic-acid gas is evolved and escapes, and a solution is obtained which may be described as containing free hypochlorous acid and chloride of calcium, which can be used as a bleaching-liquor, or it may be used for the production of pure chlorine by the addition to it of hydrochloric acid, or be converted into ordinary bleaching-liquor by the addition of lime, as before described.

This invention is especially applicable to the manufacture of bleaching-liquor by the employment of chlorine gas when mixed with carbonic-acid gas, or otherwise diluted.

To prevent loss and retard the decomposition of the volatile hydrochlorous acid, the production of the bleaching-liquor should be carried on at low temperature; and, in order to prevent loss of bleaching power, the production should be performed quickly, as an aqueous solution of hypochlorous acid is gradually changed into a solution of chloric and hydrochloric acids. This change may be retarded, as is well known, by saturating the acid with an equivalent of caustic lime or of some other alkaline base, and weak liquids so treated may be used in this manufacture instead of water in order to obtain liquors of greater strength.

Bleaching-liquor so produced may also be used for the manufacture of chlorate of potash, and for this purpose I saturate the bleaching-liquor obtained, as before mentioned, with lime, as above described, but the subsequent reactions are the same whether this saturation takes place before or after the also hereinbefore-described change of hypochlorous acid into chloric and hydrochloric acids.

For the production of chlorate of potash, therefore, some advantages will result from leaving the before-mentioned bleaching-liquor, produced according to my invention, in contact with limestone or cheap carbonate of lime, as the hydrochloric acid produced from the hypochlorous acid will thus be neutralized by the cheap carbonate of lime, and the quantity of more expensive caustic lime or base needed to complete the saturation will be lessened in an equivalent degree, and obviously an effect of the same kind will be produced if the time occupied by the process of absorbing the chlorine be prolonged.

Claims.

1. The use of carbonate of lime, such as lumps of limestone or of chalk or of carbonate of lime in a state of fine division, such as that which is obtained by causticising solutions of the carbonates of soda and of potash by means of lime, for the absorption of chlorine, as herein described.

2. The employment of carbonates of lime in a similar manner for the purpose of absorbing chlorine when the chlorine is mixed with carbonic-acid gas, or is otherwise diluted.

In witness whereof I have signed my name to this specification in the presence of two subscribing witnesses.

HENRY DEACON.

Witnesses:
  HENRY JOHNSON,
    47 *Lincoln's Inn Fields, London.*
  CHAS. MILLS,
    *His Clerk.*